United States Patent [19]

Matsuo et al.

[11] Patent Number: 5,092,140

[45] Date of Patent: Mar. 3, 1992

[54] WASHING MACHINE

[75] Inventors: Katsuharu Matsuo, Aichi; Masahiro Imai, Seto; Takaharu Yamamoto, Nagoya; Yosiyuki Makino, Seto, all of Japan

[73] Assignee: Kabushiki Kaisha Toshiba, Kanagawa, Japan

[21] Appl. No.: 680,105

[22] Filed: Mar. 25, 1991

[30] Foreign Application Priority Data

Mar. 30, 1990 [JP] Japan .................................. 2-85733

[51] Int. Cl.⁵ ............................................. D06F 33/02
[52] U.S. Cl. ................................... 68/12.04; 68/12.14
[58] Field of Search ................. 68/12.02, 12.04, 12.14

[56] References Cited

U.S. PATENT DOCUMENTS 4,235,085 11/1980 Torita .................................. 68/12.04
4,607,408 8/1986 Didier et al. ................... 68/12.04 X

FOREIGN PATENT DOCUMENTS 155894 9/1983 Japan .
11919 3/1988 Japan .
35270 7/1988 Japan .

Primary Examiner—Philip R. Coe
Attorney, Agent, or Firm—Philip M. Shaw, Jr.

[57] ABSTRACT

A washing machine installed with a brushless motor for driving an agitator and an inner tub includes a storage device storing a data table representative of a plurality of preselected rotational speed values and values of voltage applied to the brushless motor driven at each preselected speed with respect to every different load applied to the brushless motor, a load amount determining device, a control device determining the voltage applied to the motor based on the data table when one preselected speed is selected with an operating switch. An amount of load is determined when one preselected speed is selected. A suitable value of applied voltage is selected which value has a predetermined relation to the preselected speed selected in the condition of the determined amount of load. The amount of load is determined by collating the load amount and the number of revolution with the data table.

7 Claims, 12 Drawing Sheets

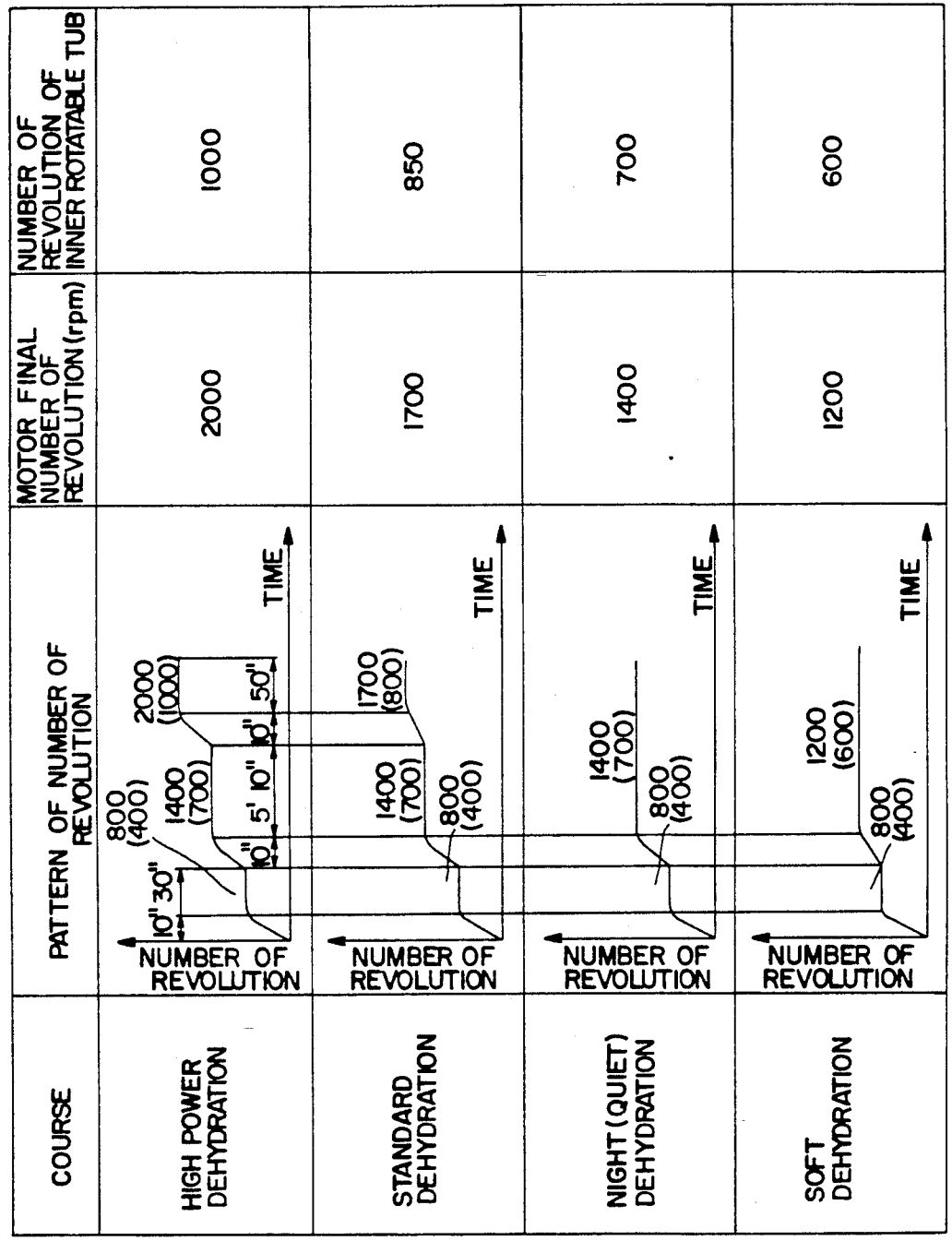

WASHING MACHINE

BACKGROUND OF THE INVENTION

This invention relates to a washing machine in which a brushless motor is employed as a washing machine motor.

In conventional washing machines, wash and rinse steps are performed by driving an agitator by a washing machine motor and a dehydration step is performed by driving an inner rotatable tub at a high speed by the motor. An induction motor has conventionally been employed as such a washing machine motor.

Small-sized and light-weighted washing machines with high-level cleaning performance have recently been desired. These needs require a washing machine motor of high output torque. However, the induction motor conventionally employed as the washing machine motor is of a relatively large size and the output torque thereof is at a relatively low level. Accordingly, in order to obtain a high output torque from the induction motor, a rating power of the induction motor needs to be increased and therefore, the size of the induction motor needs to be increased, which further increases the size of the washing machine. In view of the disadvantage described above, it has been proposed by the inventors that a brushless motor which is small in size but produces a high output torque be employed as the washing machine motor, instead of the induction motor.

However, when the brushless motor is employed as the washing machine motor, the following deficiency could be found. That is, the agitator or the inner rotatable tub of the washing machine is rotated at a predetermined number of revolution. Since the change in the number of revolution is sufficiently small with respect to load variations in the case of the induction motor, it is easy to control the number of revolution of the induction motor so that it is maintained at a predetermined value. On the other hand, in the case of the brushless motor, the number of revolution changes to a large extent with variations in an amount of load even though a voltage applied to the brushless motor does not vary. To solve this problem, it is usually considered that feedback control of the number of revolution of the brushless motor should be provided. In this feedback control, the number of revolution of the brushless motor is sensed and then, the voltage applied to the brushless motor is varied based on the deviation between the sensed number of revolution and a target number of revolution. Varying the applied voltage is continued until the sensed revolution number reaches the target revolution number.

In the above-described feedback control, however, the present number of revolution is controlled so as to be increased and decreased to the target number of revolution. Accordingly, the actual number of revolution of the motor unstably oscillates relative to the target number of revolution repeatedly, that is to say, the actual number of revolution of the motor is alternately increased and decreased repeatedly so as to sequentially converge to the target number of revolution. Further, the amount of load applied to the motor varies because of rotative movement of clothes caused as the result of drive of the agitator in the wash or rinse step or movement of the clothes due to rotation of the inner tub in the dehydration step. In this case, too, the actual number of revolution of the motor unstably oscillates repeatedly. Consequently, a disadvantage arises that an expected cleaning effect or dehydration effect cannot be achieved.

SUMMARY OF THE INVENTION

Therefore, an object of the present invention is to provide a washing machine wherein the number of revolution of the washing machine motor can be prevented from unstably oscillating repeatedly relative to the target number of revolution in the process of controlling the motor so that the target number of revolution is reached, resulting in achievement of the expected cleaning or dehydration effect.

The present invention provides a washing machine comprising a washing machine motor comprising a brushless motor, motor drive control means varying a voltage applied to the washing machine motor in accordance with a voltage command, revolution command producing means for producing a command of a target number of revolution with respect to the washing machine motor, load amount determining means for determining an amount of load applied to the washing machine motor, a storage section for storing motor drive control data indicative of predetermined relations between the voltage applied to the washing machine motor and the number of revolution of the washing machine motor with respect to every different load applied to the washing machine motor, and voltage command producing means reading out data of the voltage value applied to the washing machine motor from the storage section based on the amount of load determined by the load amount determining means and the command of the target number of revolution produced from the revolution command producing means, thereby supplying the motor drive control means with the read voltage value data as the voltage command.

The number of revolution of the brushless motor depends upon an amount of load applied thereto and a value of voltage applied thereto. When the amount of load applied to the motor can be specified, the number of revolution of the brushless motor can be controlled so as to reach the target number of revolution by adjusting the voltage applied to the same.

In accordance with the present invention, the target number of revolution of the washing machine motor is set by the revolution command producing means. The voltage command producing means operates to read out data of the voltage applied to the motor based on the amount of load determined by the load amount determining means and the target number of revolution. Thus, the value of voltage applied to the motor is established based on the voltage data read out by the voltage command producing means. Since the motor drive control means operates to vary the voltage applied to the motor in accordance with the established voltage value, the applied voltage is optimum to obtain the target number of revolution under the condition of the amount of load at that time. Consequently, the target number of revolution can be reached by the brushless motor without a feedback control though it is employed as the washing machine motor. The number of revolution of the washing machine motor can thus be prevented from unstably oscillating repeatedly relative to the target number of revolution.

The load amount determining means may be arranged so as to determine the amount of load based on at least any two of three elements, that is, the voltage applied to the washing motor, the number of revolution thereof and the load current. Preferably, the load amount determining means determines the amount of load based either on the magnitude of the voltage applied to the washing machine motor under the condition of a predetermined applied voltage or on the number of revolution thereof under the condition of the predetermined applied voltage.

The revolution command producing means may be arranged so as to output at least one intermediate target number of revolution and final target number of revolution with a predetermined timing for the purpose of water stream control in a wash or rinse step. The load amount determining means may be arranged so as to determine the amount of load in the condition that the washing motor is being driven at each of the intermediate and final target number of revolution. The voltage command producing means may be arranged so as to read out data of the voltage value applied to the washing motor from the storage section based on the target number of revolution and the amount of load determined at the present time when supplied with the command of the target number of revolution, thereby supplying the read data of the applied voltage as the command of the voltage value to the motor drive control means.

The revolution command producing means may be arranged so as to output at least one intermediate target number of revolution and final target number of revolution with a predetermined timing for the purpose of controlling a dehydration step.

Further, the revolution command producing means may also be arranged so as to read out the data from the storage section in such an order that the target number of revolution is changed with variation of the amount of load determined by the load amount determining means, thereby outputting the read data as a command value with respect to the target number of revolution with a predetermined timing.

Other objects of the present invention will become obvious upon understanding of the illustrative embodiment about to be described with reference to the accompanying drawings. Various advantages not referred to herein will occur to one skilled in the art upon employment of the invention in practice.

BRIEF DESCRIPTION OF THE DRAWINGS

FIGS. 11(a) through 11(d) illustrate motor revolution patterns of various operation courses in a dehydration step;

DESCRIPTION OF THE PREFERRED EMBODIMENTS

Figure 1:
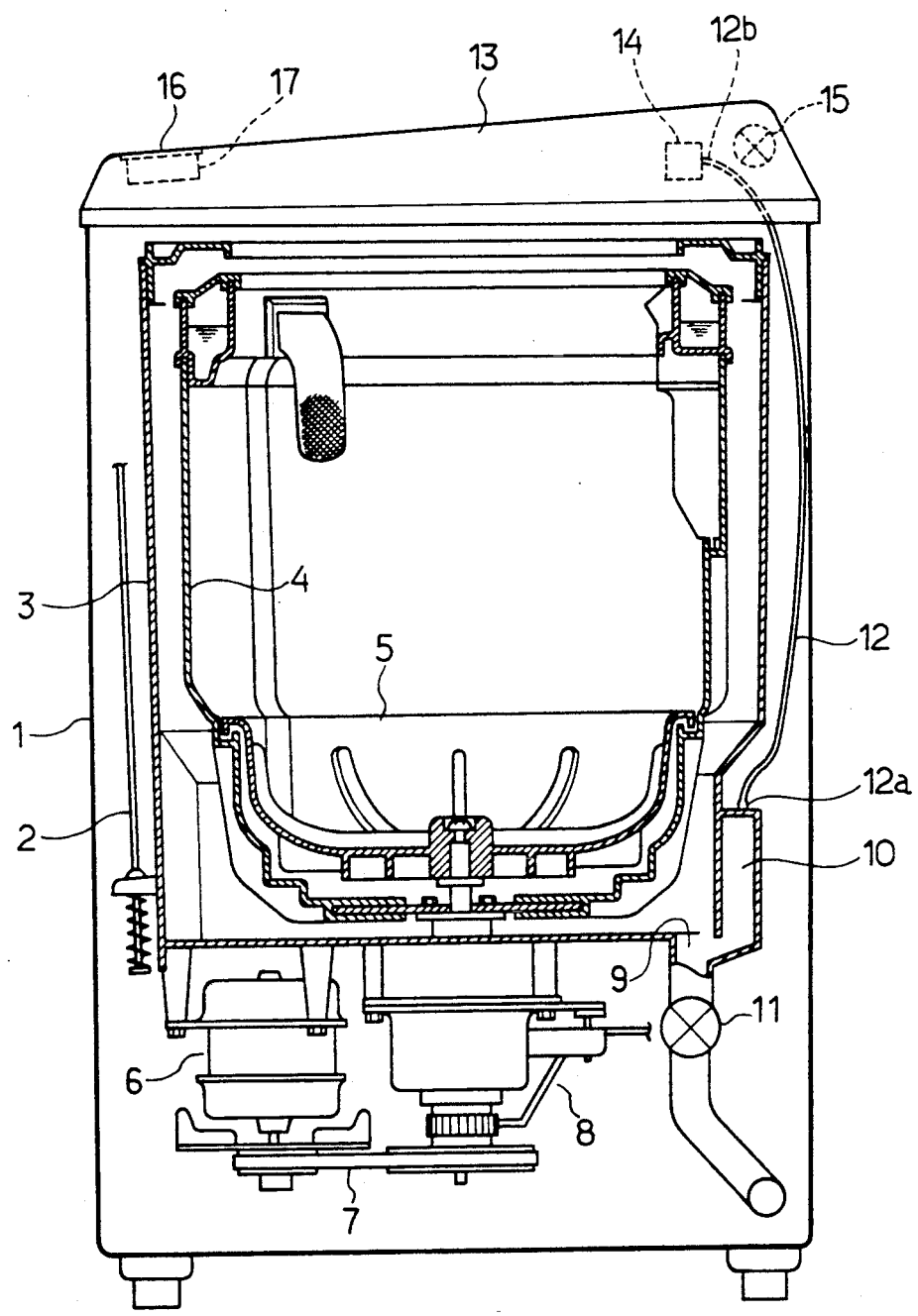
FIG. 1 is a longitudinal section of an automatic washing machine of a first embodiment in accordance with the present invention.

A first embodiment of the present invention will be described with reference to FIGS. 1 through 11 of the accompanying drawings. FIG. 1 illustrates an automatic washing machine in accordance with the present invention. An outer water-receiving tub 3 is held by an elastic suspension mechanism 2 in an outer cabinet 1. An inner wash and dehydration tub 4 is rotatably mounted in the outer tub 3. A container-shaped agitator 5 is provided in the inner tub 4. On the outer bottom of the outer tub 3 are mounted a washing machine motor 6, a belt transmission mechanism 7 and a drive mechanism 8. The washing machine motor 6 is formed into a three-phase brushless motor. This brushless motor is substantially included in known dc motors and comprises a stator having a field coil, a permanent magnet rotor and a positional sensor for switching a field winding current. Rotational force of the washing machine motor 6 is transmitted to the drive mechanism 8 through the belt transmission mechanism 7. The drive mechanism 8 transmits the motor rotational force to the agitator 5 in wash and rinse steps, thereby rotating the agitator 5. The drive mechanism 8 transmits the motor rotational force to the agitator 5 and the inner tub 4 in a dehydration step, thereby rotating them simultaneously.

A drain hole 9 is formed in the bottom of the outer tub 3 and an air trap 10 is provided on the outer lower portion of the outer tub 3. A drain valve 11 is provided for opening and closing the drain hole 9. One 12a of two ends of an air tube 12 is connected to the air trap 10. The other end 12b of the air tube 12 is connected to a water level sensor 14 provided in the rear interior of an upper cover 13 mounted on the top of the outer cabinet 1. The water level sensor 14 comprises a semiconductor pressure sensor. A water supply valve 15 is also provided in the rear interior of the upper cover 13. An operation panel 16 is mounted on the front of the upper cover 13 and a control unit 17 is provided behind the operation panel 16.

Figure 2:
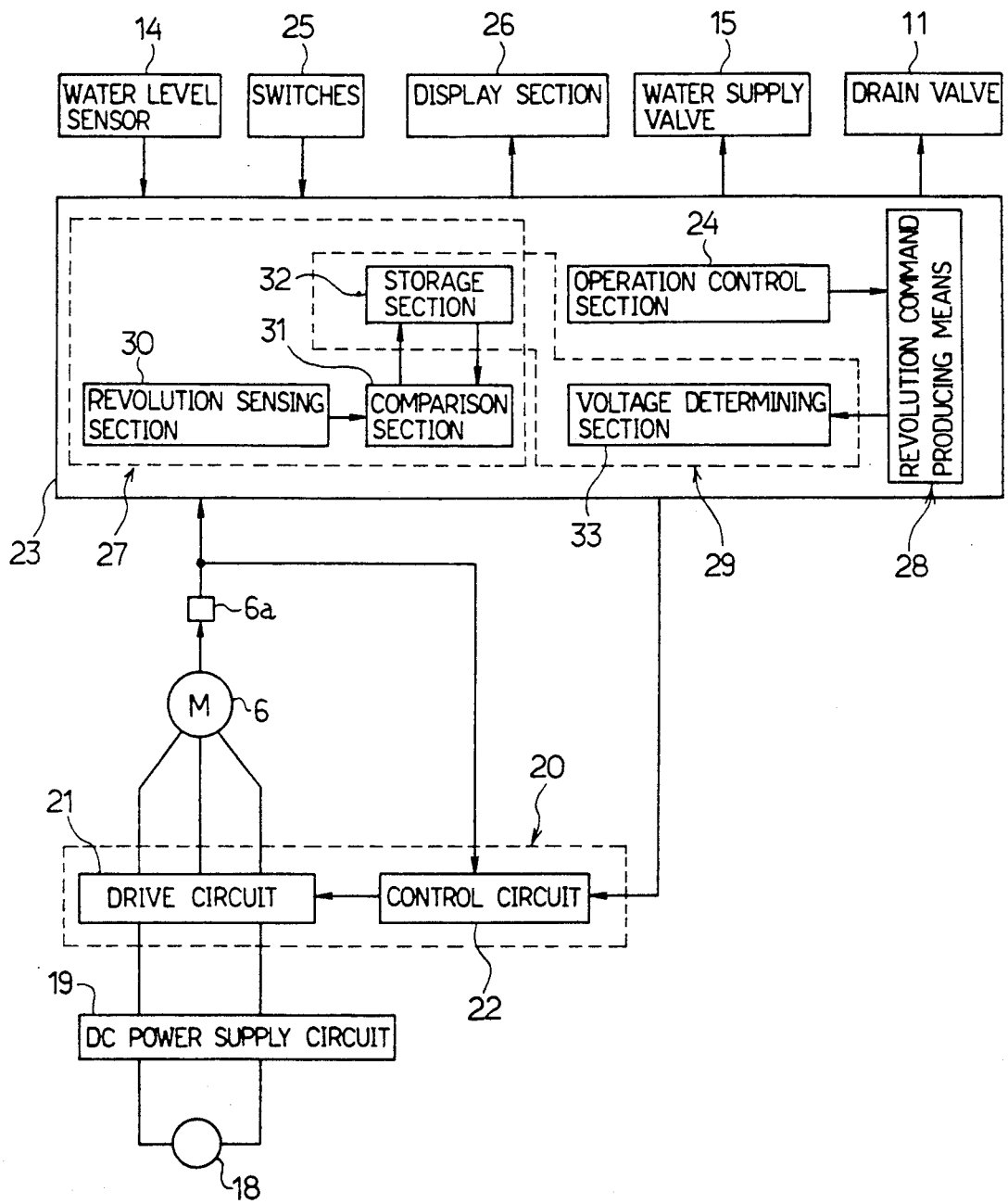
FIG. 2 is a block diagram showing an electrical arrangement of the washing machine.
Figure 3:
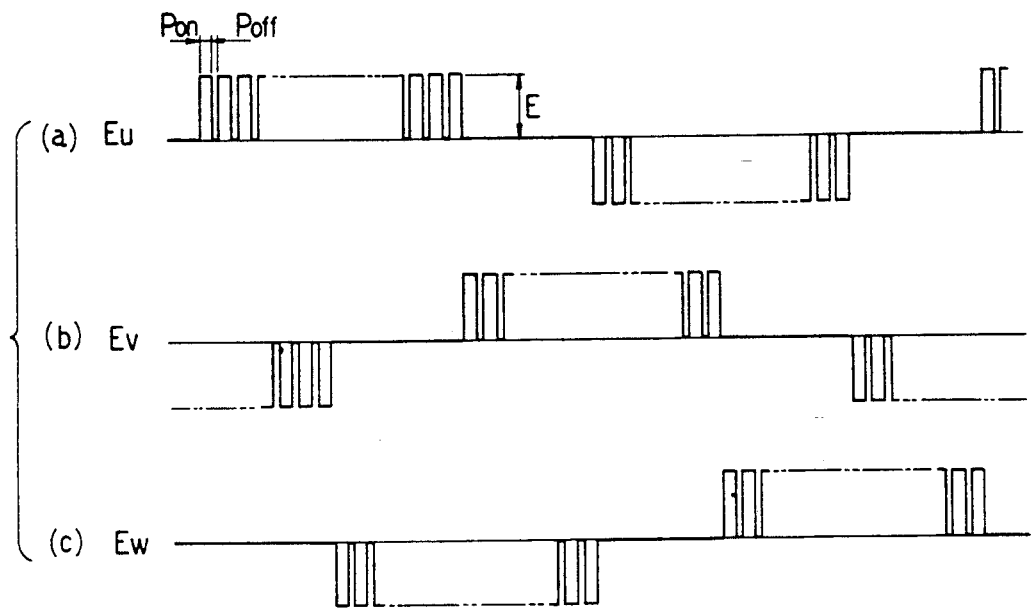
FIGS. 3(a), 3(b) and 3(c) are waveform charts showing output waveforms of a motor drive control circuit employed in the washing machine of the first embodiment.

Referring to FIG. 2 illustrating an electrical arrangement of the washing machine, a power supply circuit of the washing machine motor 6 will be described. A dc power supply circuit 19 comprising a bridge diode and a smoothing capacitor is connected to an ac power supply 18. A dc output from the dc power supply circuit 19 is supplied to a drive circuit 21 forming a part of a motor drive control circuit 20 serving as motor drive control means. The drive circuit 21 is arranged to apply voltages $E_u$, $E_v$ and $E_w$ to the motor 6 in energization patterns shown in FIGS. 3(a)–3(c) in accordance with respective motor phases. The voltage applied to the motor 6 (effective voltage) is established by a pulse width modulation (PWM) control of the maximum voltage E and proportional to the duty ratio ($P_{on}/(P_{on}+P_{off})$). The voltages $E_u$, $E_v$ and $E_w$ have phase difference of 120 degrees from one another in the electrical angle. An energization timing control with respect to the each phase coil of the motor 6 and a PWM control are performed by a control circuit 22 forming the motor drive control circuit 20 with the drive circuit 21. The control circuit 22 operates to determine the energization timing based on a signal generated by a position sensing element 6a comprising a Hall IC chip sensing the rotational position of a rotor magnet of the motor 6. The control circuit 22 further operates to determine the duty ratio for the purpose of the PWM control based on a voltage command produced from voltage command producing means 29 which will be described later.

A microcomputer 23 is provided with an operation control section 24 arranged in software to control an overall washing operation including the dehydration step. When switch input from various switches 25 provided in the operation panel 16 and the signal from the water level sensor 14 are supplied to the microcomputer 23, the operation control section 24 of the microcomputer 23 operates to control the water supply valve 15, the drain valve 11 and a display section 26 provided in the operation panel 16 and further, the microcomputer 23 functions as load amount determining means 27, the revolution command producing means 28 and the voltage command producing means 29 arranged in software.

Figure 4:
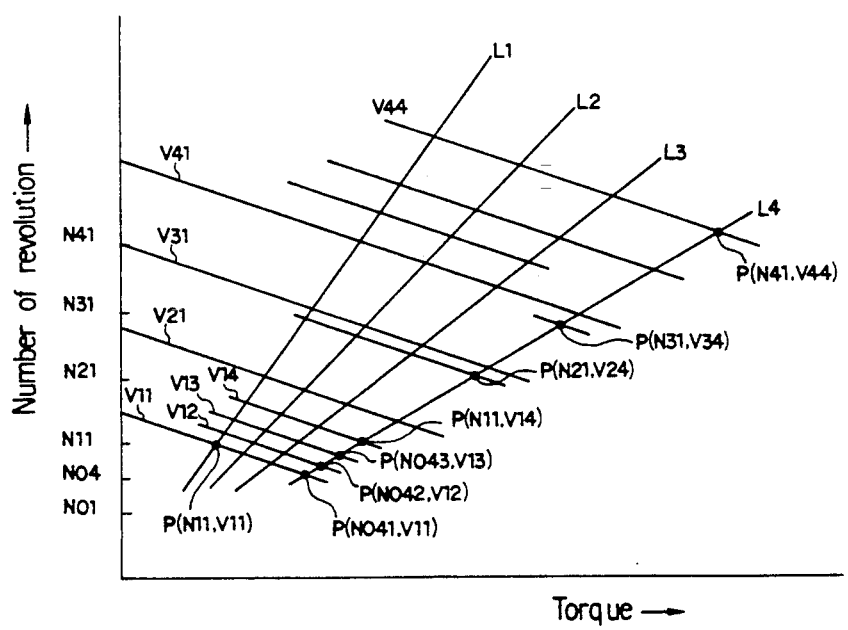
FIG. 4 is a graph showing relations among the voltage applied to a washing machine motor, the number of revolution thereof and an amount of load applied thereto.

The load amount determining means 27 utilizes the position sensing element 6a as a revolution sensor. The load amount determining means 27 comprises a revolution sensing section 30 sensing the number of revolution of the motor 6 based on the signal from the position sensing element 6a, a comparison section 31 and a storage section 32. FIG. 4 graphically shows functional relations between the number of revolution of the motor 6 and the voltage applied to the motor 6 with an amount of load applied to the motor 6 as a parameter in order that the relations between the applied voltage and the number of revolution are represented for each load amount. The functional relations graphically shown in FIG. 4 have been obtained from experiments though concrete numeric values are not presented. The storage section 32 stores a data table which is represented as the graph in FIG. 4. In FIG. 4, an axis of abscissas represents a torque T proportional to the load current and an axis of ordinates the number of revolution N. Relations between the voltage applied to the motor 6 and the number of revolution of the motor 6 are presented in the condition that the amount of load applied to the motor 6 is shown by each of $L_1$, $L_2$, $L_3$ and $L_4$. For example, the number of revolution of the motor 6 is represented by $N_{11}$ when the voltage $V_{11}$ is applied to the motor 6 in the condition that the load amount is represented by $L_1$. That is, in the case where the applied voltage is gradually increased from 0 in the condition that the load amount is $L_1$, the number of revolution reaches $N_{11}$ when the applied voltage takes the value represented by $V_{11}$. In this case since the torque T is approximately proportional to the current, the amount of load can be obtained when two of three elements, current, applied voltage and number of revolution are obtained. The load amount determination means 27 operates to determine the amount of load when supplied with a control command form the operation control section 24.

The revolution command producing means 28 produces a command about the target number of revolution with respect to the motor 6 with a predetermined timing based on the control command from the operation control section 24. For example, the target number of revolution is changed in accordance with each operation courses selected with an operation course selecting switch included in the switches 25. FIGS. 5(a)-5(g) show patterns of changes in the number of revolution of the motor 6 in execution of the wash or rinse step. The wash or rinse step has "EXTREME," "STANDARD (WHIRLPOOL)," "STANDARD (AGITATION)," "BLANKET," "NIGHT (QUIET)," "SOFT" and "SOAK" courses. The washing machine motor 6 is forward and reverse rotated and the number of revolution is successively increased during the starting period to reach the target number of revolution in each course. For example, in the "STANDARD (WHIRLPOOL)" course, the target number of revolution is 1,155 r.p.m. and the motor 6 is forward rotated for 1.3 seconds, deenergized for 0.5 seconds, reverse rotated for 1.5 seconds and deenergized for 0.5 seconds sequentially. This pattern is repeated.

FIGS. 11(a)-11(d) show patterns of motor revolution build-up in "HIGH," "STANDARD," "NIGHT" and "LOW" courses in the dehydration step. For example, in the "STANDARD" course, the number of revolution of the motor 6 is gradually increased to 800 r.p.m. (400 r.p.m. of the inner tub 4) in the initial 10 seconds and the motor revolution is maintained at 800 r.p.m. for 30 seconds. The number of revolution is then increased to 1,400 r.p.m. in the following 10 seconds and maintained at 1,400 r.p.m. for 5 minutes and 10 seconds. The, the number of revolution is further increased to 1,700 r.p.m. in the following 10 seconds and maintained at 1,700 r.p.m. for 50 seconds.

The voltage command producing means 29 comprises a voltage determining section 33 and the above-described storage section 32, which is commonly used both in load amount determination means 27 and in the voltage command producing means 29. When supplied with the set revolution command from the operation control section 24, the voltage command producing means 29 operates to determine the voltage applied to the motor 6 based on the data stored in the storage section 32 and selected in accordance with the target number of revolution and the amount of load determined at the present time, which data being the same as that shown in FIG. 4. The determined applied voltage is supplied to the control circuit 22 of the motor drive control circuit 20.

Figure 5:
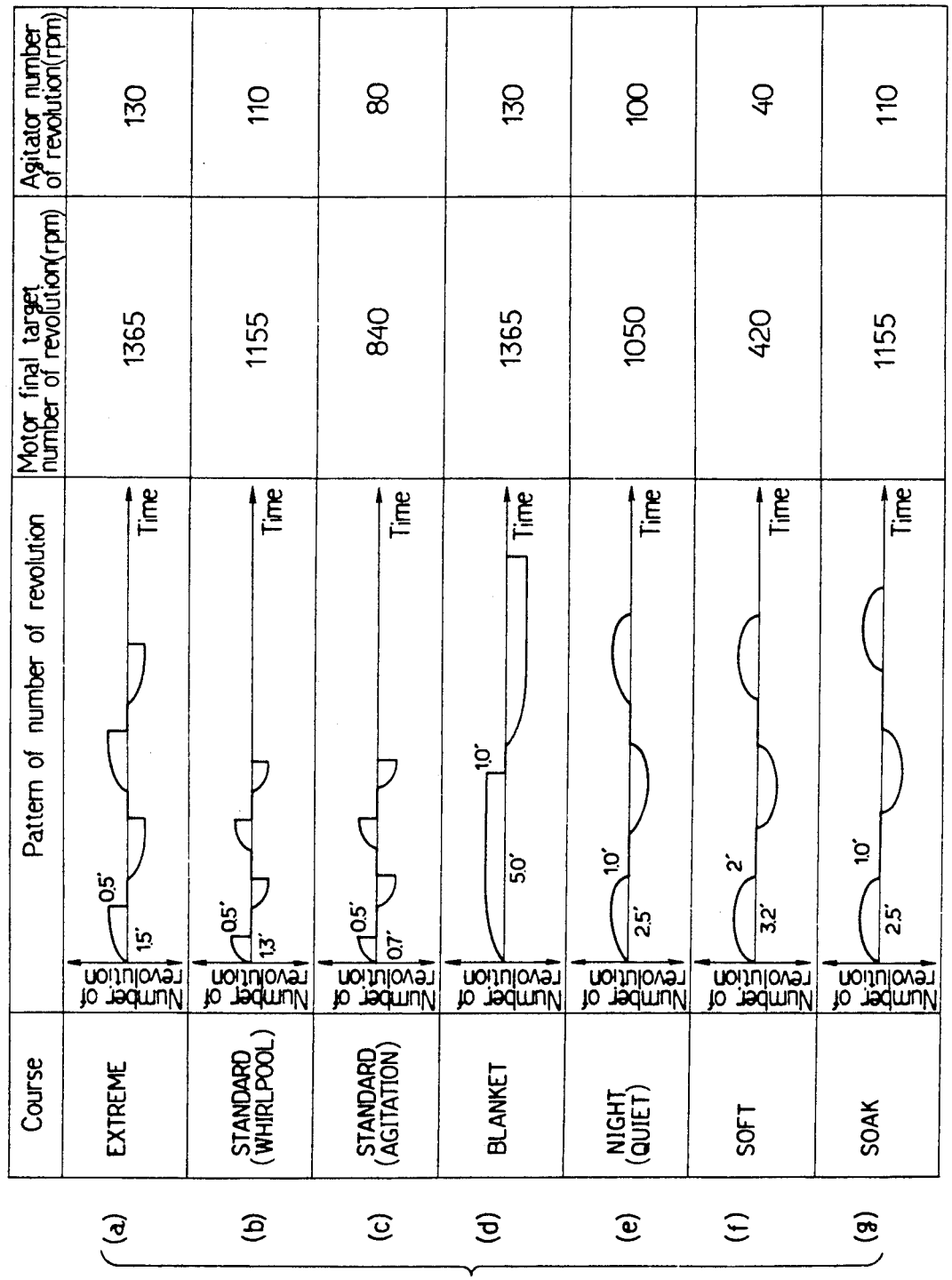
FIGS. 5(a) through 5(g) illustrate motor revolution patterns of various operation courses in a wash or rinse step.
Figure 6:
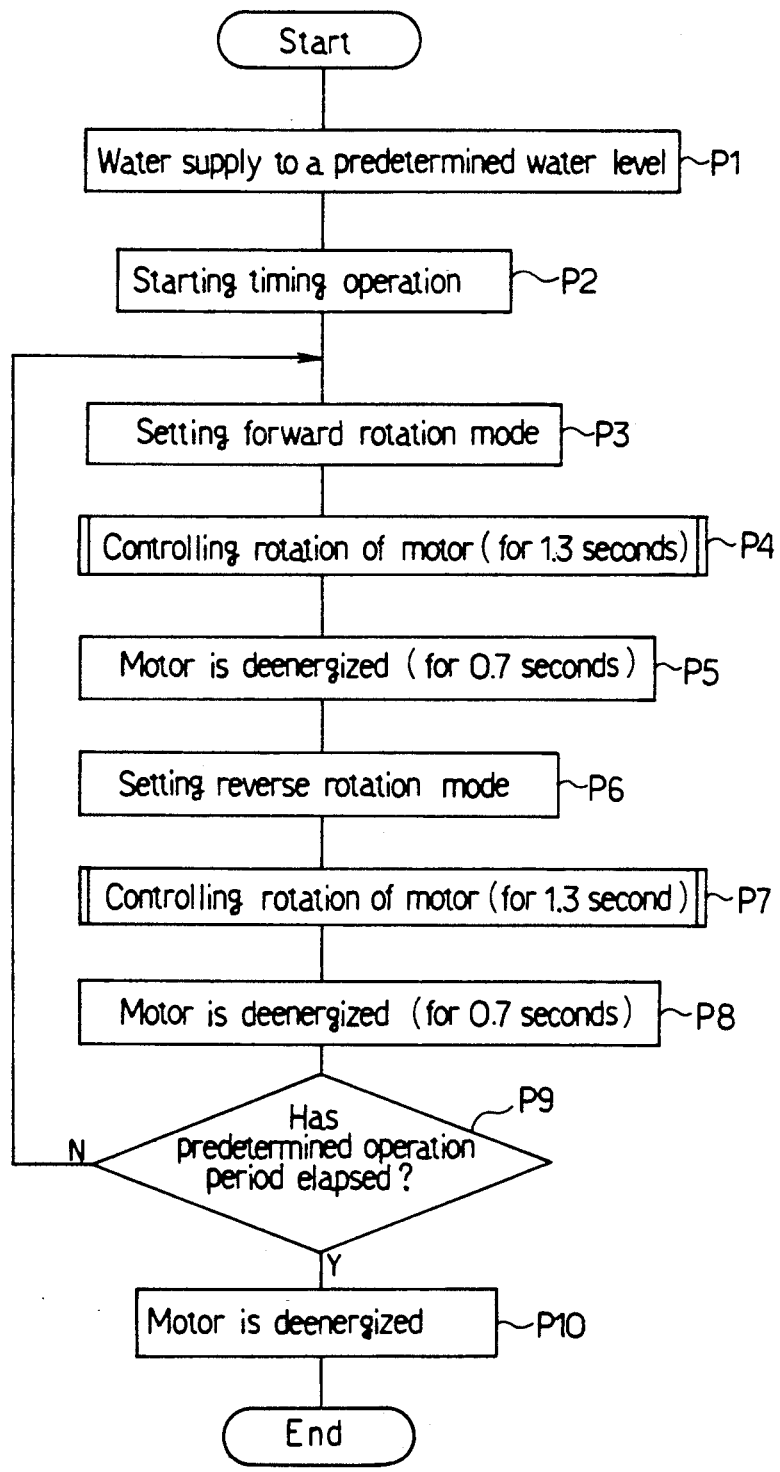
FIGS. 6 through 9 are flowcharts showing control manners of a device in FIG. 2.
Figure 7:
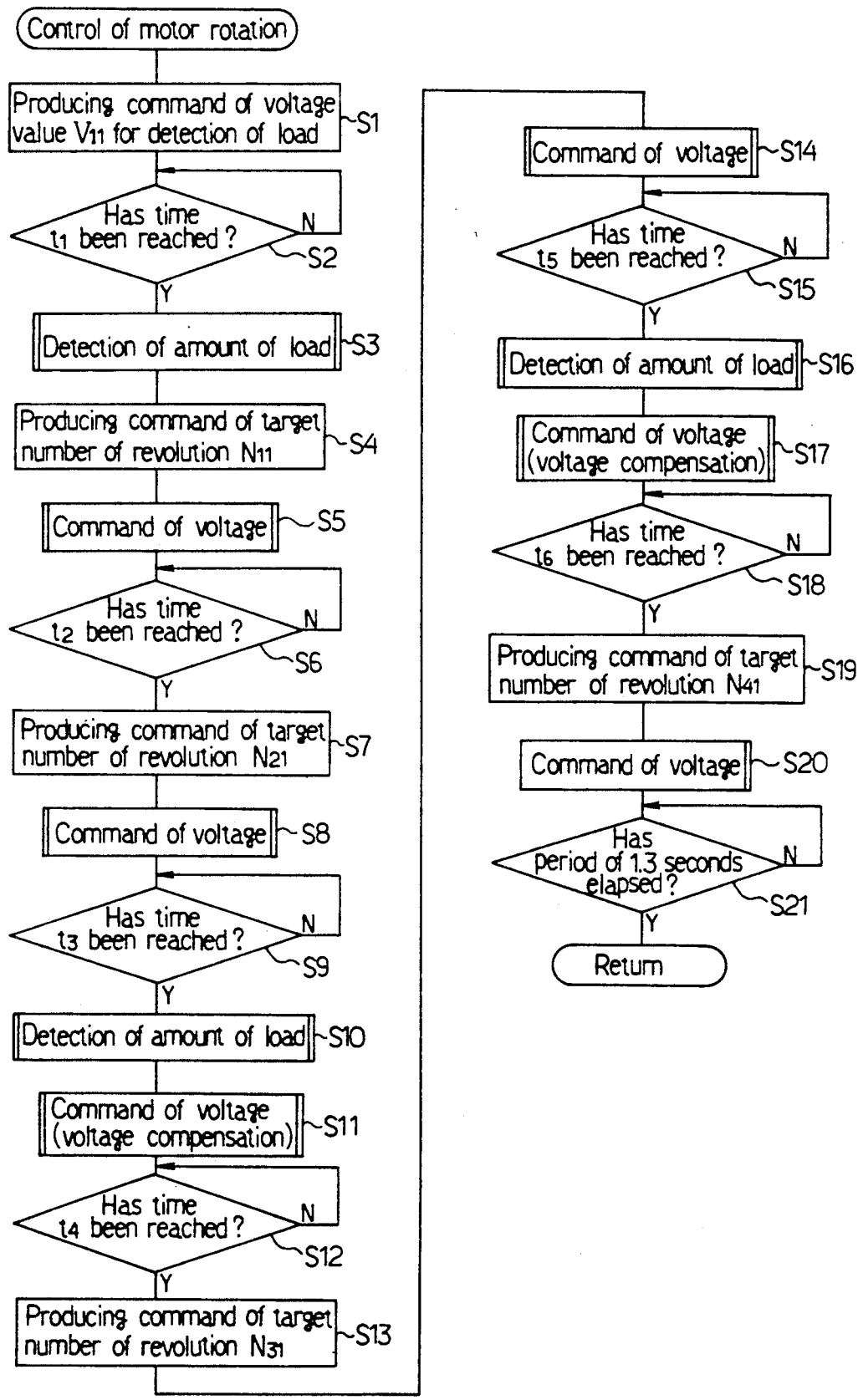

Operation of the washing machine will be described together with operations of the operation control means 24, the load amount determining means 27, the revolution command producing means 28 and the voltage command producing means 29 with reference to FIGS. 6 and 7. For example, execution of the "STANDARD (WHIRLPOOL)" course in the wash or rinse step will be described. FIG. 6 shows a control manner of the microcomputer 23 for the "STANDARD (WHIRLPOOL)" course in the wash or rinse step. In this course, as shown in FIG. 5, the washing machine motor 6 is forward rotated for 1.3 seconds, deenergized for 0.5 seconds, reverse rotated for 1.3 seconds and deenergized for 0.5 seconds sequentially, repeatedly. The target number of revolution is 1,155 r.p.m. First, the water supply is executed and water is supplied to the inner tub 4 until a predetermined water level in accordance with the "STANDARD (WHIRLPOOL)" course is reached, at step P1. Subsequently, a timing operation is initiated at time $t_0$ in FIG. 10, at step P2. A forward-rotation mode is selected from forward and reverse rotation modes of the motor 6 at step P3. Selection of one of the forward and reverse rotation modes is performed by switching the order of energization of the three phase coils of the motor 6. The motor 6 is energized for the predetermined time period (1.3 seconds) in the forward rotation mode at step P4. The control manner at step 4 is shown in FIG. 7. The motor 6 is then deenergized for 0.7 seconds at step P5. Then, the reverse rotation mode is selected at step P6 and the motor 6 is energized for 1.3 seconds in the reverse rotation mode at step P7. The control manner in the step P7 is shown in FIG. 7. The motor 6 is then deenergized for 0.7 seconds at step 8. The above-described operation of the motor 6 is repeated for a predetermined operation period and it is determined at step P9 whether the predetermined operation period has elapsed. The washing machine motor 6 is deenergized at step P10, thereby completing the "STANDARD (WHIRLPOOL)" course.

Figure 10A:
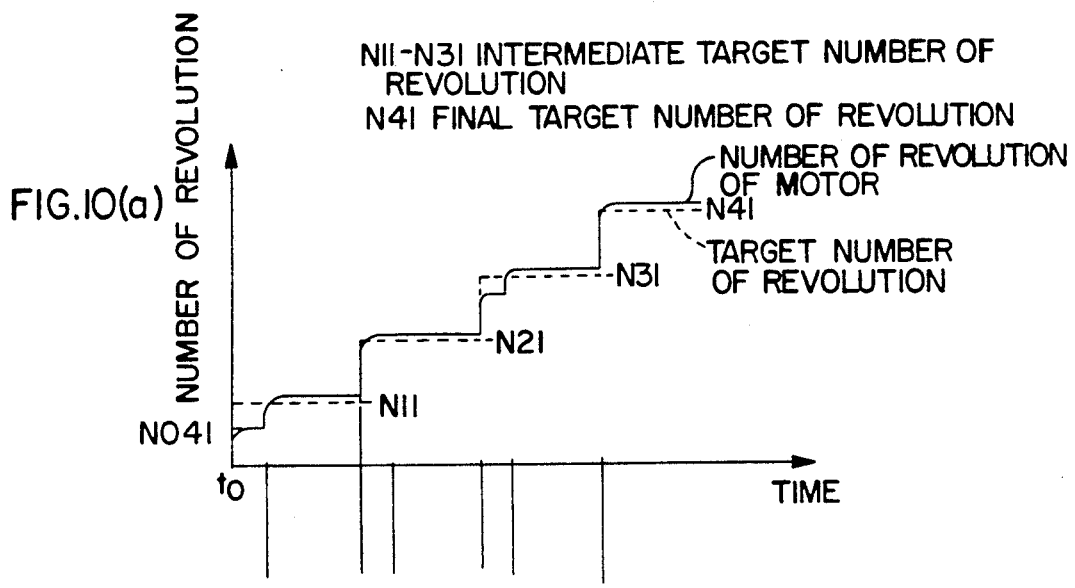
FIGS. 10(a) and 10(b) are graphs showing changes of the number of revolution of the washing machine motor and variations in the voltage applied thereto.

The control manners of forward and reverse rotation in the above-described steps P4 and P7 will be described in detail with reference to FIG. 7. The final target number of revolution (1,155 r.p.m.) in each of the forward and reverse rotation of the motor 6 is represented by $N_{41}$ in FIG. 10(a) showing an example of revolution changes. In this case three values of intermediate target number of revolution N11, N21 and N31 in sequence from the smallest are set with respect to the target number of revolution N41 (1,155 r.p.m.) for promotion of smooth rise in the number of revolution of the motor 6.

Referring to FIGS. 7, 8, 9, 10(a) and 10(b), a command to select a voltage value $V_{11}$ for determining a load amount is supplied to the control circuit 22 of the motor drive control circuit 20 at step S1 in FIG. 7. The control circuit 22 responsive to the command operates to PWM control the drive circuit 21 at the duty ratio in accordance with the voltage value $V_{11}$ such that the output voltage of the drive circuit 21 corresponds to voltage $E_{11}$ in accordance with the voltage value $V_{11}$. See FIG. 10(b). Consequently, the voltage $E_{11}$ in accordance with the voltage value $V_{11}$ is applied to the motor 6. Consequently, the motor 6 produces the number of revolution depending upon an amount of load under the condition of the applied voltage $E_{11}$.

Figure 8:
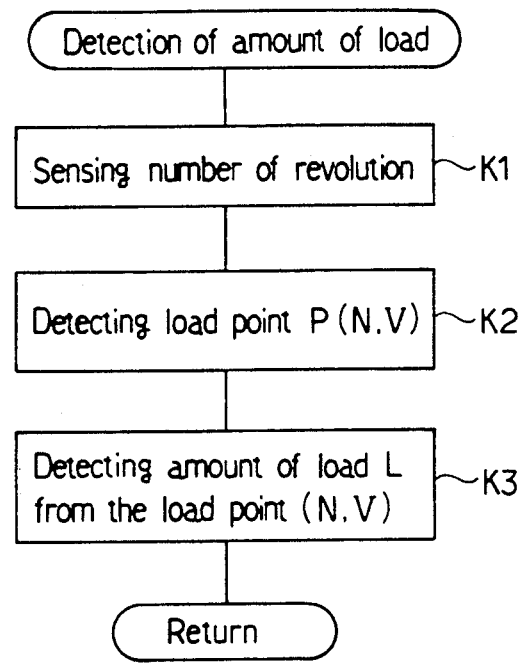
Figure 10B:
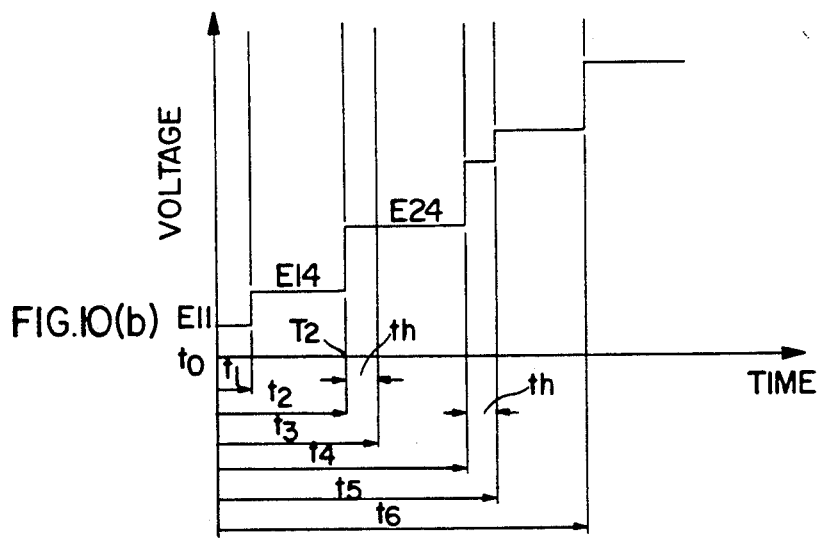

Determination of the amount of load is executed at step S3 when the lapse from the above-described timing initiation time $t_0$ in FIGS. 10(a) and 10(b) reaches an initial load amount determination time $t_1$ at step S2. FIG. 8 shows a control manner for the load amount determination. First, the number of revolution of the motor 6 is obtained from signal generation intervals of the position signal from the position sensing element 6a, at step K1 in FIG. 8. A load point P (N, V) as shown in FIG. 4 is detected based on the obtained number of revolution and the applied voltage $E_{11}$ ($V_{11}$ in FIG. 4) at the time when the number of revolution is obtained at step K2. The load amount L is determined from the load point P (N, V). In this case, for example, when the obtained number of revolution is represented by $NO_{41}$ which is larger than $NO_4$, the load amount L (the load amount $L_4$, in this case) is determined from a load amount line on the load point P ($NO_{41}$, $V_{11}$) represented by $V_{11}$ and $NO_{41}$. Subsequently, the microcomputer 23 moves to step S4 in FIG. 7.

Figure 9:
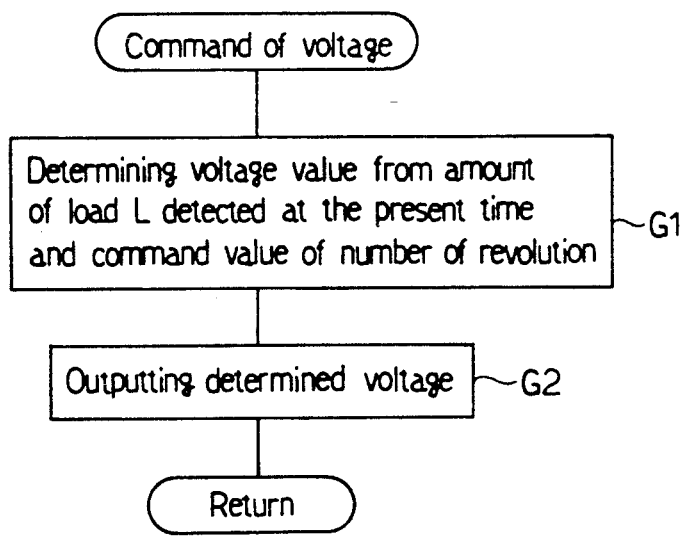

A command is produced about the first intermediate target number of revolution at step S4 and the voltage command is executed at step S5. FIG. 9 shows a control manner for the voltage command. Data of the applied voltage value is read out from the storage section 32 based on the amount of load ($L_4$) determined at the present time and the target number of revolution $N_{11}$ and the applied voltage value indicated by the data read out is established at step G1. The applied voltage is established in the following manner. In the graph of FIG. 4, since the determined amount of load is represented by $L_4$, a load point P ($N_{11}$, $V_{14}$) corresponding to the revolution number $N_{11}$ on the load amount $L_4$, thereby establishing the voltage value $V_{14}$. The established voltage value $V_{14}$ is supplied to the motor drive control circuit 20 at step G2. The control circuit 20 of the motor drive control circuit 20 then operates to control the output voltage of the drive circuit 21 so that it takes the voltage $E_{14}$ (FIG. 10(b)) in accordance with the established voltage value $V_{14}$. Consequently, the motor 6 is rotated at the intermediate target number of revolution $N_{11}$. The microcomputer 23 then moves to step S6 in FIG. 7.

A command is produced about the second intermediate target number of revolution at step S7 when the lapse from the above-described timing start time $t_0$ reaches the time $t_2$ at step S6. Then, the voltage command is executed at step S8. Execution of the voltage command is previously described with reference to FIG. 9. Since the load amount determined at the present time is shown by $L_4$, the applied voltage value is established so as to take the value $V_{24}$ based on the determined load amount $L_4$ and the second intermediate target number of revolution $N_{21}$. A command about the established applied voltage value $V_{24}$ is supplied to the motor drive control circuit 20. Accordingly, the motor 6 is rotated at the second intermediate target number of revolution $N_{21}$ when the amount of load is not varied.

The detection of the amount of load (step S10) and the voltage command (step S11 in FIG. 7) are executed for the purpose of compensation when the lapse from $t_0$ reaches the time $t_3$ after completion of execution of the voltage command at step S8. The period $t_h$ between $t_3$ and $t_4$ is a relatively short compensating period. The reason for execution of the load amount detection (step S10) and the voltage command (step S11) is the same as described above. That is, the number of revolution of the motor 6 is set at the second target number of revolution $N_{21}$ in the condition of the voltage value $V_{24}$ when the amount of load is not hitherto varied. However, when the amount of load is varied the actual number of revolution of the motor 6 is sometimes deviated from the target number of revolution $N_{21}$. The load amount determination (step S10) and the voltage command (step S11) are executed to compensate for the deviation of the number of revolution of the motor 6 at an early stage of operation. The established voltage value is again set at the voltage value $V_{24}$ in the case where the motor 6 is actually rotating approximately at the second target number of revolution $N_{21}$. In the embodiment, the voltage value is maintained at the value $V_{24}$.

Thereafter, the command about the third intermediate target number of revolution $N_{31}$ is produced, at step S13 when the lapse from $t_0$ reaches the time $t_4$, at step S12. The voltage command is executed based on the produced command about the target number of revolution $N_{31}$ at step S14. FIG. 9 shows the control manner at step S14. In this case, too, when the lapse from the time $t_0$ reaches the time $t_5$ at step S15, the load amount determination (step S16) and the voltage command (step S17) are executed for compensation of the amount of load.

Subsequently, when the lapse from $t_0$ reaches $t_6$ at step S18, a command about the target number of revolution is produced at step S19. The voltage command is executed based on the command about the target number of revolution $N_{41}$ at step S20. The number of revolution of the motor 6 is thus increased successively to the final target number of revolution with respect to the initial forward rotation of the motor. Thereafter, the above-described forward rotation control is completed when 1.3 seconds elapse from the time ($t_0$) of start of the forward rotation of the motor 6. The microcomputer 23 returns to step P5 in FIG. 6 and the motor 6 is deenergized for 0.7 seconds. Then, control for the reverse rotation of the motor 6 is executed in the same manner as described above at steps P6 and P7 and, again, the motor 6 is deenergized for 0.7 seconds after completion of the reverse rotation control.

As the result of the above-described control of rotation of the motor 6, the agitator 5 is forward and reverse rotated, which causes the wash water and clothes in the inner tub 4 to flow in the same directions, thereby performing the wash or rinse step for the clothes to be washed.

The control manner in the "STANDARD (WHIRLPOOL)" course has been described. Although in the other courses, particularly, in the "EXTREME," "STANDARD (AGITATION)" and "BLANKET" courses, periods of forward and reverse rotation and a period of deenergization of the motor 6 differ from those in the "STANDARD (WHIRLPOOL) course, the control mode is the same as in this course. However, in the "NIGHT (QUIET)," "SOFT" and "SOAK" courses, the number of revolution of the motor 6 is decreased gradually but not instantaneously at a final stage of each of the forward and reverse rotation. The control for such revolution number reduction can be performed by successively decreasing the target number of revolution.

In accordance with the above-described embodiment, the amount of load applied to the motor 6 is determined by the load amount determining means 27. Based on the data read out from the data table, the value of voltage applied to the motor 6 is determined by the voltage command producing means 29 so as to correspond to the determined amount of load and the target number of revolution. The voltage applied to the motor 6 takes the value suitable for obtaining the target number of revolution in the condition of the present amount of load. Consequently, although the brushless motor is used as the washing machine motor 6, the target number of revolution can be reached without the feedback control. Consequently, the number of revolution of the motor can be prevented from unstably oscillating relative to the target number of revolution and an expected target number of revolution of the motor can be reached promptly and smoothly, which provides an expected high cleaning effect.

In particular, a plurality of intermediate target number of revolution and a final target number of revolution are set as the target number of revolution of the motor 6. The number of revolution of the motor 6 is successively increased by producing the voltage command for each target number of revolution with a predetermined timing. Consequently, since the number of revolution of the motor 6 is not instantaneously increased to the final target number of revolution in the wash and rinse steps, swash of the wash water can be reduced, which enhances the noise reduction. More specifically, when the number of revolution of the motor is instantaneously increased to the final target number of revolution, the wash water is caused to swash in the inner tub in the wash and rinse steps, resulting in noise. However, since the number of revolution is increased stepwise in the foregoing embodiment, swash of the wash water and the noise due to the wash water swash can be prevented. In particular, since the value of voltage applied to the motor is determined based on the present amount of load and the following target number of revolution when the target number of revolution is increased stepwise, the voltage value can always be determined in accordance with variations in the amount of load. Consequently, the number of revolution of the motor can be stably increased to the target number of revolution in accordance with the amount of load even when the amount of load varies.

The number of revolution of the motor 6 is controlled in the dehydration step in the same manner as described above. For example, when the "STANDARD DEHYDRATION" course is selected from the dehydration courses in FIG. 11, the number of revolution of the motor 6 is increased to the first intermediate target number of revolution or 800 r.p.m. 10 seconds after start of the dehydration operation. The number of revolution of the motor 6 is maintained at 800 r.p.m. for 30 seconds. Then, the number of revolution is increased to the second intermediate target number of revolution, 1,400 r.p.m. in 10 seconds. The number of revolution is maintained at 1,400 r.p.m. for 5 minutes and 10 seconds. Thereafter, the number of revolution is further increased to the final target number of revolution, 1,700 r.p.m. in 10 seconds and maintained at 1,700 r.p.m. for 50 seconds In this case, too, the number of revolution of the motor 6 is controlled in the same manner as shown in FIG. 7 when the number of revolution is increased to each target number of revolution. Accordingly, in the dehydration step, too, the amount of load applied to the motor 6 is determined by the load amount determining means 27. Based on the data read out from the data table, the value of voltage applied to the motor 6 is determined by the voltage command producing means 29 so as to correspond to the determined amount of load and the target number of revolution. The voltage applied to the motor 6 takes the value suitable for obtaining the target number of revolution in the condition of the present amount of load. Consequently, although the brushless motor is used as the washing machine motor 6, the target number of revolution can be reached without the feedback control. Consequently, the number of revolution of the motor can be prevented from unstably oscillating relative to the target number of revolution and an expected target number of revolution of the motor can be reached promptly and smoothly, which provides an expected high dehydration effect. In determination of the amount of load in the dehydration step, data of the data table stored in the storage section 32 differs from the data for the wash step but the kinds of data elements (voltage, number of revolution and amount of load) are the same as those for the wash step.

In particular, in the dehydration step, too, a plurality of intermediate target number of revolution and a final target number of revolution are set as the target number of revolution of the motor 6. The number of revolution of the motor 6 is successively increased by producing the voltage command for each target number of revolution with a predetermined timing. Consequently, since the number of revolution of the motor 6 is not instantaneously increased to the final target number of revolution in the dehydration step, unbalance rotation of the inner tub 4 can be overcome. More specifically, when the number of revolution of the motor is instantaneously increased to the final target number of revolution, the number of revolution of the motor reaches a range in which the unbalance rotation of the inner tub is likely to occur before the dehydration of the clothes in the inner tub 4 sufficiently progresses or the weight of the clothes depending upon water content is sufficiently reduced. As a result, there is a possibility that the low-speed unbalance rotation of the inner tub may continue for a long period. However, since the number of revolution is increased stepwise in the foregoing embodiment, the dehydration of the clothes has sufficiently progressed with the weight thereof depending upon water content reduced when the number of revolution of the motor reaches the range in which the unbalance rotation of the inner tub is likely to occur. Consequently, even if the unbalance rotation of the inner tub occurs, it can be overcome since it is slight. In particular, since the value of voltage applied to the motor is determined based on the present amount of load and the following target number of revolution when the target number of revolution is switched to another, the voltage value can always be determined in accordance with variations in the amount of load. Consequently, the number of revolution of the motor can be stably increased to the target number of revolution in accordance with the amount of load even when the amount of load varies.

Figure 12:
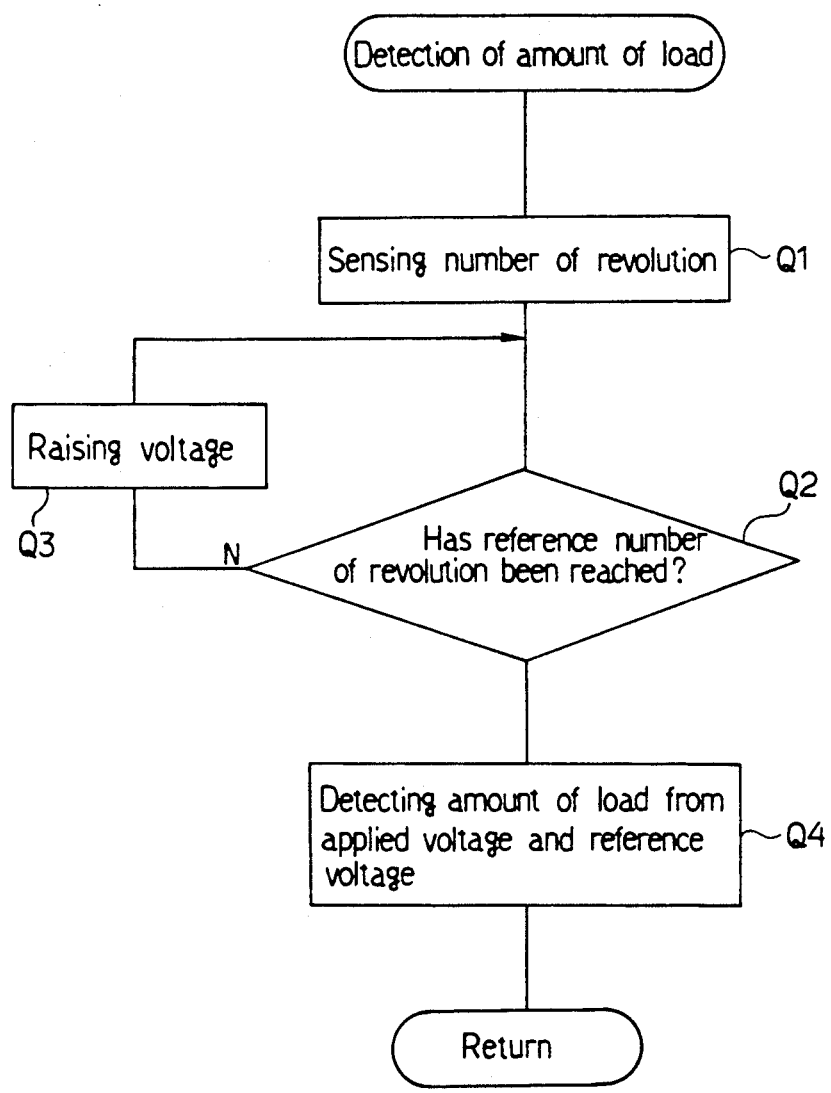
FIG. 12 is a flowchart showing a control manner for determination of the amount of load in a second embodiment.
Figure 13A:
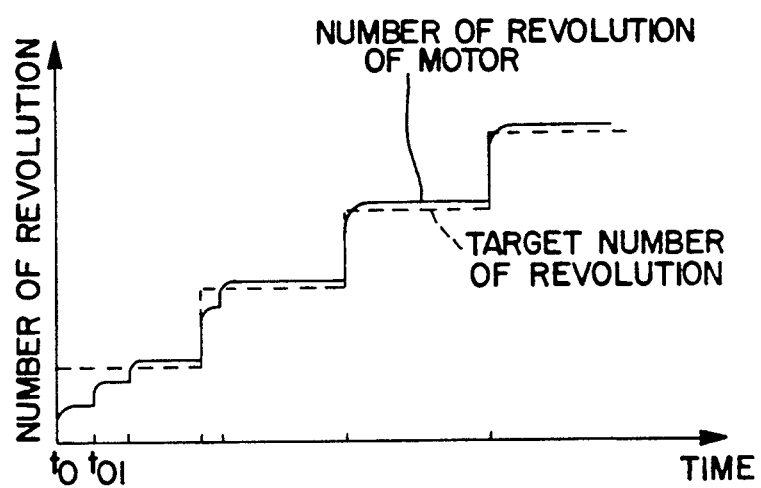
FIGS. 13(a) and 13(b) are graphs showing changes of the number of revolution of the motor controlled in the manner in FIG. 12 and variations of the in the voltage applied to the motor.
Figure 13B:
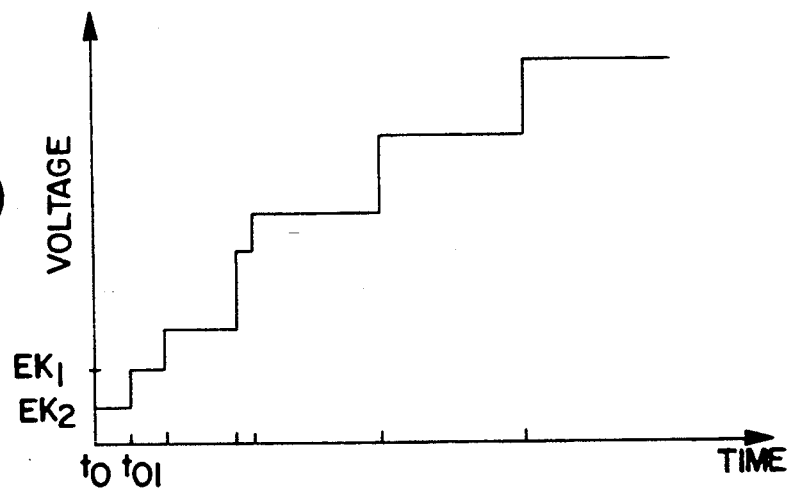

FIG. 12 shows a second embodiment of the invention. In the second embodiment, the function of the load amount determination means in performing an initial determination of the amount of load differs from that in the previous embodiment. In the initial determination of load amount in FIG. 7, the amount of load is determined from the number of revolution of the motor with the voltage applied thereto maintained at the predetermined value ($V_{11}$). However, in the second embodiment, a reference number of revolution of the washing machine motor 6 is provided. An amount of load applied to the motor 6 is determined based on the voltage applied to the motor 6 corresponding to the reference number of revolution. More specifically, the voltage applied to the motor drive control circuit 20 is increased stepwise until the sensed number of revolution of the motor 6 reaches the reference number of revolution at steps Q1, Q2 and Q3. FIG. 13($b$) shows the values $Ek_1$ and $Ek_2$ of the applied voltage and output timing $t_0$ and $t_{01}$ of the applied voltage. FIG. 13($a$) shows an example of changes in the number of revolution of the motor 6 and the reference number of revolution.

When the sensed number of revolution of the motor 6 reaches the reference number of revolution, the amount of load is determined from the present applied voltage and the reference number of revolution based on the data table made on data such as shown in FIG. 4, at step Q4. The number of revolution of the motor 6 can be prevented from being extremely increased since the amount of load is determined from the applied voltage corresponding to the predetermined reference number of revolution. That is, in the case where the amount of load is determined from the number of revolution of the motor to which a predetermined voltage is applied, the number of revolution is likely to be extremely increased when the amount of load applied to the motor is extremely small, resulting in damage in the clothes. Particularly, this tendency can be seen when the amount of load is determined in the condition that the water level in the inner tub is relatively low. However, in the second embodiment, the reference number of revolution is previously provided and the amount of load is determined from the applied voltage corresponding to the reference number of revolution. Consequently, the number of revolution of the motor can be prevented from being increased more than necessary and accordingly, the amount of load can be determined without damaging the clothes.

Figure 14:
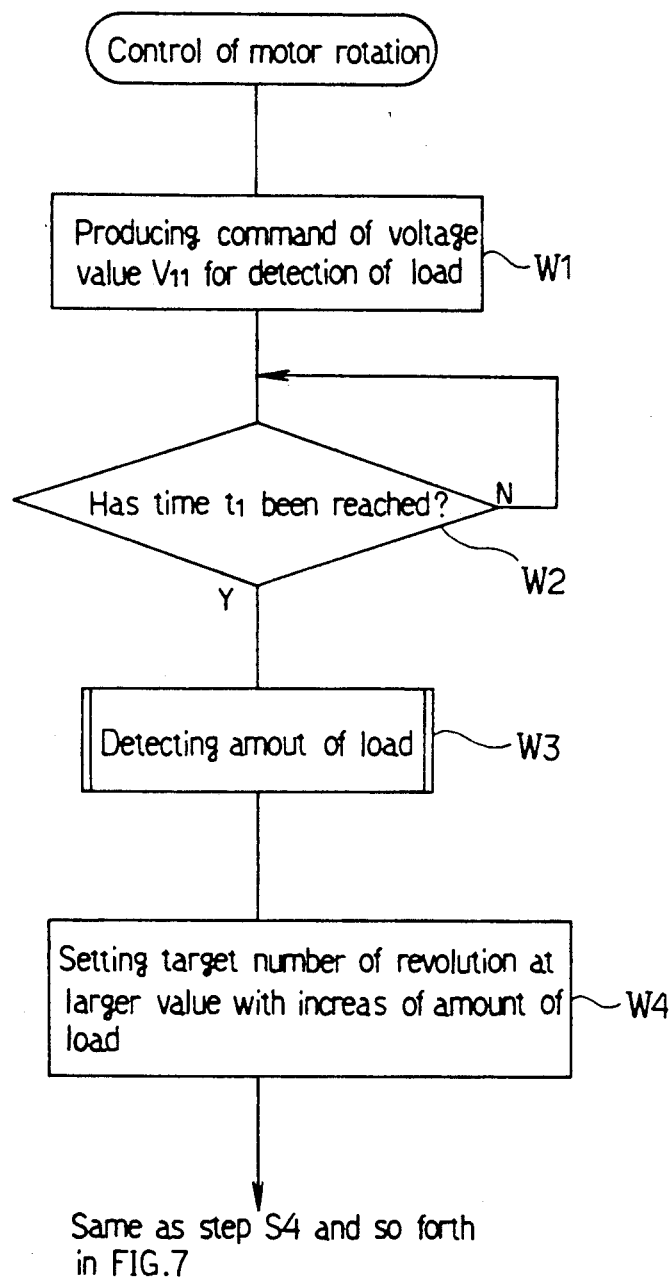
FIG. 14 is a flowchart showing a control manner in the case of setting the number of revolution of the motor in a third embodiment.

FIG. 14 illustrates a third embodiment of the invention. The control manner from the start of control to the determination of the load amount (steps W1, W2 and W3) is the same as that in steps S1-S3 in FIG. 7. In the third embodiment, however, the final target number of revolution and intermediate number of revolution are determined so as to take larger values with increase in the determined amount of load, at step Q4. In this case the data table is made based on the graph of FIG. 4 but the amount of load is increased from $L_4$ to $L_1$.

In accordance with the third embodiment, the number of revolution of the agitator 5 is increased in the wash and rinse steps when the amount of load applied to the motor 6 is large, thereby enhancing the cleaning effect. When the amount of load is small, the number of revolution of the agitator 5 is reduced such that the clothes are prevented from being damaged. Furthermore, in the dehydration step, insufficiency in the dehydration can be prevented when the amount of clothes to be washed is large and occurrence of rumples in the clothes due to over-dehydration can be prevented when the amount of clothes to be washed is small.

Although the amount of load applied to the motor is determined based on the voltage applied to the motor and the number of revolution of the motor in the foregoing embodiments, the invention should not be limited to this. Since the number of revolution and the load current vary in accordance with the amount of load in the case of the brushless motor, it is noticed that the amount of load can be determined easily and accurately from two of three elements, that is, the applied voltage, the number of revolution and load current, these elements having a functional relation with the amount of load as a parameter.

Although the washing machine motor 6 is forward and reverse rotated intermittently in the wash or rinse step in the foregoing embodiments, it may be rotated in one direction intermittently.

Although the invention is applied to an automatic washing machine and the washing machine motor serves as a common drive source both for the agitator and for the inner tub in the foregoing embodiments, the invention may be applied to a twin-tub type washing machine wherein a wash motor and a dehydration motor are operated in the same manner as the washing machine motor in the foregoing embodiments.

The foregoing disclosure and drawings are merely illustrative of the principles of the present invention and are not to be interpreted in a limiting sense. The only limitation is to be determined from the scope of the appended claims.

We claim:

1. A washing machine comprising:

a) a washing machine motor comprising a brushless motor;
b) motor drive control means varying a voltage applied to the washing machine motor in accordance with a voltage command;
c) revolution command producing means for producing a command of a target number of revolution with respect to the washing machine motor;
d) load amount determining means for determining an amount of load applied to the washing machine motor;
e) a storage section for storing motor drive control data indicative of predetermined relations between the voltage applied to the washing machine motor and the number of revolution of the washing machine motor with respect to every different load applied to the washing machine motor; and
f) voltage command producing means reading out data of the value of voltage to be applied to the washing machine motor from the storage section based on the amount of load determined by the load amount determining means and the command of the target number of revolution produced from the revolution command producing means, thereby supplying the motor drive control means with the read voltage value data as the voltage command.

2. A washing machine according to claim 1, wherein the load amount determining means comprises means for establishing the voltage applied to the washing machine motor, means for sensing the number of revolution of the washing machine motor under the condition that an established voltage has been applied to the washing machine motor, and means for collating the established applied voltage and sensed number of revolution with the motor drive control data stored in the storage section to specify an amount of load corresponding to a parameter between the established applied voltage and sensed number of revolution.

3. A washing machine according to claim 1, wherein the load amount determining means comprises means for detecting the voltage applied to the washing motor, means for setting the number of revolution of the washing machine motor at a desirable value, and means for collating, with the motor drive control data stored in the storage section, the target number of revolution and the detected voltage applied to the washing machine motor being driven at the target number of revolution to thereby specify an amount of load corresponding to a parameter between the target number of revolution and detected voltage applied to the washing machine motor being driven at the target number of revolution.

4. A washing machine according to claim 1, wherein the load amount determining means comprises means for specifying an amount of load based on at least two of three elements of the voltage applied to the motor, a motor load current and the number of revolution of the motor, the two elements having a functional relation with the load amount as a parameter.

5. A washing machine according to claim 1, wherein the revolution command producing means operates to output at least one intermediate target number of revolution and final target number of revolution with a predetermined timing for the purpose of water stream control in a wash or rinse step, the load amount determining means operates to determine the amount of load in the condition that the washing motor is being driven at each of the intermediate and final target number of revolution, and the voltage command producing means operates to read out data of the value of voltage to be applied to the washing motor from the storage section based on each target number of revolution and the amount of load determined at the present time when supplied with the command of each target number of revolution, thereby supplying the read data of the applied voltage as the command of the voltage value to the motor drive control means.

6. A washing machine according to claim 1, wherein the revolution command producing means operates to output at least one intermediate target number of revolution and final target number of revolution with a predetermined timing for the purpose of controlling a dehydration step, the load amount determining means operates to determine the amount of load in the condition that the washing motor is being driven at each of the intermediate and final target number of revolution, and the voltage command producing means operates to read out data of the value of voltage to be applied to the washing motor from the storage section based on each target number of revolution and the amount of load determined at the present time when supplied with the command of each target number of revolution, thereby supplying the read data of the applied voltage as the command of the voltage value to the motor drive control means.

7. A washing machine according to claim 1, wherein the revolution command producing means reads out the data from the storage section in such an order that the target number of revolution is increased with increase of the amount of load determined by the load amount determining means.

* * * * *